United States Patent Office 3,432,362
Patented Mar. 11, 1969

3,432,362
ELECTRODE CATALYST FOR ELECTROCHEMICAL CELL PREPARED WITH ORGANOALUMINUM REDUCING AGENT
Wolfram R. Kroll, Linden, N.J., assignor to Esso Research and Engineering Company, a corporation of Delaware
No Drawing. Continuation-in-part of application Ser. No. 281,347, May 17, 1963. This application Apr. 11, 1967, Ser. No. 629,909
U.S. Cl. 136—120    19 Claims
Int. Cl. H01m 27/10

ABSTRACT OF THE DISCLOSURE

Transition metal compounds are treated with organometallic reducing agents in solution and subsequently hydrolyzed to recover a finely divided metal precipitate which is then deposited upon a suitable base material, the resulting product being useful as an electrode in electrochemical cells, e.g., fuel cells.

CROSS REFERENCE

This invention relates to improvements in electrochemi-application Ser. No. 281,347, filed May 17, 1963.

FIELD OF INVENTION

This invention relates to improvements in electrochemical cells and particularly to those cells designed for direct production of electrical energy through electrochemical oxidation of a combustible or nonmetallic fuel. More particularly, this invention relates to a method of making a highly efficient electrode catalyst system. Still more particularly, this invention relates to a method and catalyst prepared by reducing metal compounds with organometallic reducing agents in solution, hydrolizing the solution to recover a finely divided metal, and depositing the metal on a suitable base material.

PRIOR ART

The term "fuel cell" is used herein and in the art to denote a device, system, or apparatus in which the chemical energy of a fluid combustible fuel, such as hydrogen, carbon monoxide, or an organic compound containing hydrogen, e.g., methanol, in its molecular structure is electrochemically converted to electrical energy at a nonsacrificial or inert electrode. The true fuel cell is adapted for continuous operation and is supplied with both fuel and oxygen from sources outside the cell proper. Such cells include at least two nonsacrificial or inert electrodes, functioning as anode and cathode, respectively, which are separated by an electrolyte which provides ionic conductance therebetween, conduction means for electrical connection between anode and cathode external to the electrolyte, means for admitting a fluid fuel into dual contact with the anode and electrolyte, and means for admitting oxygen in dual contact with the cathode and electrolyte. Where necessary, or where desirable, the electrolyte compartments are divided into an anolyte and a catholyte compartment by an ion permeable partition or ion exchange membrane or plurality of same. Thus, in each such cell a fuel is oxidized at the anode and an oxidant is reduced at the cathode upon receiving electrons from the anode.

Electrodes of the type to be described are also employed in electrolytic cells which, unlike the above-mentioned fuel cells, do not provide a net production of electrical energy, but in which an organic fuel is oxidized electrochemically at the anode. On such cells, a direct current of electrical energy from an external source, namely a fuel cell, a storage battery, or an alternating current rectifier, is admitted to the electrical circuit of the cell to provide the necessary elecrical current to operate the cell. Such cells can be used for the electrochemical production of various organic chemicals, such as the conversion of alcohols or hydrocarbons to ketones.

Electrodes for use in these cells vary considerably in design and composition. Although a single metal structure, e.g., platinum, as sheet or screen, or a structure of porous carbon, such as a flat sheet, or porous carbon cylinder can be used alone, electrodes most commonly comprise a conductive base structure with a metal catalyst chemically and/or physically bound to the surface of the base. Such electrodes include those wherein the electrode base structures are porous, nonporous, metallic, or nonmetallic.

The prior art methods for preparing the catalyst metal for the electrode have generally been rather slow and costly. This conclusion is normally due to the fact that the metal must be in its zero valence state in order for it to be an efficient catalyst. Consequently, costly procedures, such as electrodeposition, reduction with hydrogen at high temperatures, e.g., 1000° F., reduction with expensive silanes, and like procedures, have been employed. However, the present process for preparing the catalyst and/or electrode offers a simple yet relatively inexpensive method for producing the metal in its elemental state. Further, the process of this invention leads to the preparation of a metal in such finely divided form that the metal is in an amorphous rather than a crystalline state. This result is indeed surprising since commercial metal powders are generally crystalline or contain a large portion of crystalline material. Additionally, most commercial metal powders are larger than 0.1 micron whereas the finely divided metals of this invention are much smaller, e.g., 0.001 to 0.008 micron, and in some cases cannot be accurately measured due to their minute size.

SUMMARY OF INVENTION

It has now been discovered that highly effective catalysts and/or electrodes for use in cells of the type hereinbefore described can be prepared by reacting a mixture of at least one or more metal compounds with an organometallic reducing agent, hydrolyzing the mixture, thereby precipitating the metal or metals in a finely divided state, recovering the finely divided metal precipitate, and depositing the finely divided metal onto a suitable base material. This procedure yields highly efficient single metal catalysts, e.g., platinum, palladium, rhenium, iridium, rhodium and mixtures and alloys of metals, e.g., platinum-rhenium, platinium-iridium, or combinations of noble and base metals, e.g., platinum-titanium, rhodium-molybdenum, etc.

The catalyst may consist of a single metal or several metals as either a mixture or an alloy. The metals may be either noble metals or base metals or one of more noble metals with one or more base metals. The noble metals applicable to this invention are the metals of the platinum group, i.e., platinum, palladium, iridium, rhodium, ruthenium, and osmium, and also gold, silver, and rhenium. The base metals of this invention include the transition metals, i.e., metals from Group IB–VIIIB, particularly preferred metals being iron, cobalt, nickel, molybdenum, chromium, manganese, tungsten, titanium, zinc, copper, cadmium, and vanadium. Of the noble metals, platinum is preferred, either singly or as a mixture or alloy. Of the base metals, the Group VIIB transition metals are preferred particularly manganese and most particularly rhenium. One skilled in the art will readily determine the proper base metal or metals for use with specific electrolytes. For example, rhenium, which is somewhat acid soluble, can be used in conjunction with a noble metal, e.g., platinum, in a strongly acidic, hot electrolyte.

The selection of the anionic component of the metal salt or compound is not critical and both organic as well as inorganic components may be employed. Typical examples of inorganic radicals that may be employed are halides, e.g., chorides, bromides, $SiF_6^-$, cyanides, azides, etc. However, organic radicals, such as acetates and naphthenates, are preferred anionic components because of their excellent solubility and drying characteristics. A particularly preferred orgnaic component is the chelate, e.g., the acetylacetonate, due to its excellent solubility and ready availability. Of course, other chelates, such as dimethylglyoxime derivatives, tropolonates, salicylaldehydes, etc., can be used. Other organic components that may be employed are the salts of organic acids, e.g., acetates, propionates, butyrates, valerates, etc., stearates, laurates, oleates, and other fatty salts, also salts of alcohols, such as butanols, hexanols, octanols, glycols, eicosanols, cyclododecanols, etc., and alkoxides, e.g., chlorides, benzoates, carbonates, acetylacetonates, and the like.

The selection of a reducing agent is an important feature of this invention since it may affect the activity of the catalyst systems. Generally Group I–III organometallic compounds can be employed, e.g., aluminum, sodium. However, organoaluminum and organomagnesium compounds are preferred, particularly the organoaluminum compounds. Thus, this invention will now be discussed with reference to organoaluminum compounds, bearing in mind that the other organometallics will operate similarly. The organoaluminum reducing agents can be represented by the following formula: $Al(R)_2X$ wherein R is hydrogen or a $C_1$–$C_{20}$ hydrocarbyl radical, preferably selected from the group consisting of $C_1$–$C_{20}$ alkyl, e.g., ethyl, propyl, isopropyl, butyl, isobutyl, pentyl, hexyl, heptyl, octyl, etc., both iso- and normal; cycloalkyl, e.g., cyclopentyl, cyclohexyl, cyclopentadienyl; aryl, e.g., phenyl, naphthyl; and alkaryl, e.g., benzyl and is preferably $C_2$–$C_{20}$ hydrocarbyl and more preferably $C_2$–$C_4$ alkyl, and X is selected from the group consisting of $R_1$ halogen, pseudohalogen and OR, R being as previously described, and at least one valence of the aluminum is satisfied by a hydrocarbyl radical. Preferred reducing agents are $Al(R)_2H$, $Al(R)_2OR$, and $Al(R)_3$, the latter two being particularly preferred. Typical examples of the reducing agents that may be employed are: $(C_2H_5)_2AlO(n-C_4H_9)$, $Al(i-C_4H_9)_3$, $Al(C_2H_5)_3$, $Al(C_3H_7)_3$, $Al(i-C_4H_9)_2H$, triphenyl aluminum, trihexadecyl aluminum, ethyl aluminum sesquichloride, and the like.

The molar ratio of reducing agent to metal salt is normally reported in terms of the molar ratio of aluminum to metal. Thus, the molar ratio of the aluminum to metal, when using either form of reducing agent, should be at least 1/1, and an excess is generally preferred. The ratio is more preferably about 1/1 to 15/1, still more preferably 1/1 to 10/1, and still most preferably 1/1 to 4/1.

The reduction of the metal is preferably carried out in the presence of an inert solvent, although solvents are not essential to the success of the invention. Among the solvents that can be employed are $C_5$–$C_{20}$ parans, e.g., pentane, hexane, heptane, octane, etc.; $C_6$–$C_{12}$ aromatics, e.g., benzene, toluene, xylene; partially hydrogenated aromatics; ethers, amines, etc. Preferred solvents are hydrocarbons and Lewis bases, e.g., dioxanes, tetrahydrofuran, diisopropyl ether, dialkyl ethers generally, diphenyl ether, $C_1$–$C_{10}$ tertiary amines, etc. Of the Lewis bases the ethers are preferred.

Th reduction is easily effected by mixing the reducing agent and metal salt. The operating conditions are not critical and in most cases ambient conditions of temperature and pressure may be employed. Nevertheless, temperatures ranging from about −60° C. to about +150° C. may be employed, preferably −10° C. to +100° C. Under circumstances where the metal compound does not instantaneously dissolve, the reduction may be accelerated, without deleterious effect, by employing temperatures in the upper portion of the mentioned ranges. Pressure has little bearing on the reaction and subatmospheric, e.g., 0.1 atm., as well as superatmospheric, e.g., 100 atm., conditions may be employed.

The finely divided metal is now obtained by hydrolyzing the complex system produced above. Hydrolysis is accomplished by the addition of either a dilute acid or a dilute base in a molar ratio of at least 3 moles hydrolyzing agent per mole of reducing agent. The selection of the particular aqueous acid or base is not critical and conventional materials may be employed, e.g., HCl, $H_2SO_4$, NaOH, etc. The concentration of the hydrolyzing medium should range from 2–20 wt. percent preferably 5–10 wt. percent.

An important feature in the hydrolysis of the soluble system to yield the pure metal is the selection of an acidic or basic hydrolyzing media. This choice is governed by the particular metal present in the complex system. Those skilled in the art will realize that certain metals are soluble in acid and will in such instances employ a basic hydrolyzing agent. In other instances acid hydrolysis will necessarily be employed due to dissolution of the transition metal in basic solutions.

This method of obtaining finely divided metals is equally amenable to the production of finely divided metal alloys. Thus, complex systems comprising two or more metal salts or compounds and an organoaluminum reducing agent may be hydrolyzed thereby yielding a precipitate which is an alloy of the free metals. Although no sufficient theoretical explanation is available, it has now been found that the hydrolysis of a complex system containing both acid and base soluble metals results in the production of alloys. For example, a platinum-rhenium alloy will be produced by acid hydrolysis although rhenium is known to be soluble in acid. It is believed that the rhenium is chemically adsorbed by the platinum in a manner that prevents its dissolution.

The precipitate may then be recovered from the solution by known methods, e.g., centrifugation, decanting, filtration, etc. However, since the metal is of an extremely small particle size, it is highly active and sensitive to oxygen. Thus, storage of the metal in a hydrocarbon solution, or under an inert atmosphere, e.g. nitrogen, argon, etc., is recommended.

The catalyst may be deposited on the electrode by any of the convenient methods known in the art. Typical methods include coating the electrode base member with an organic solvent containing the free metal and subsequently evaporating the solvent, also by the application of an organic binder containing the free metal to the surface of the electrode base. A preferred method of applying the catalyst of the present invention to an electrode is by means of mechanical pressure. In this manner the catalyst is pressed onto the electrode in the absence of any solvents or binders.

Another preferred way of depositing the active fuel cell catalyst on the electrode is the following: after the metal or metal mixture has been reduced in solution, as previously described, the electrode is immersed into the reduced solution and kept there during the hydrolysis step. Thus, the finely divided metal or alloy is directly deposited upon the electrode.

The base material can be a platinum screen, a metal screen generally, a specially shaped metal or carbon rod and others.

The invention will be further understood by reference to the following examples.

Example 1

(a) 108 mg. cobalt-II-acetylacetonate in dimethoxyethane are treated with 800 mg. triisobutyl-aluminum in heptane. After completion of the reduction, the solution is added slowly to 20 ml. degassed concentrated sodium hydroxide solution. After half an hour stirring at room temperature, the finely divided metal was floating between the two layers and could be recovered by decanting and drying. The solid recovered is magnetic and consists of small, needle-like pieces with a length of 0.1 micron and a diameter of 0.02 micron. It consists of active cobalt with small amounts of aluminum.

(b) 1.414 grams $PtCl_4$ were dissolved in diglyme and reduced with 13.2 grams triisobutyl-aluminum during 30 minutes. A dark colored, soluble system was obtained. This then was alcoholyzed with methanol followed by hydrolysis with dilute sulfuric acid. A black solid was obtained, which after drying was analyzed. It was not crystalline and was highly pyrophoric. Analysis showed 98.2% Pt and 0.4% Al.

Example 2

751 mg. $PtCl_4$ and 287 mg. $Re_2O_7$ were treated with dimethoxy-ethane and then reduced with 2.4 grams triisobutyl-aluminum. After the reduction a dark colored solution was obtained. This solution was then hydrolyzed with 10% sodium hydroxide solution and the resulting solid precipitated by centrifugation. After repeated washing with water, a black solid was obtained containing an approximate ratio (molar) of rhenium to platinum of 1:5 and traces of aluminum. The material is mostly amorphous or microcrystalline.

Example 3

A finely divided platinum metal was prepared as described in Example 1(b). However, the solid platinum obtained from the hydrolysis was kept moist because of its extreme sensitivity towards oxygen. The moist platinum metal was mechanically pressed on a platinum screen. This pressing process is extremely delicate since it involves the protection of the active metal as well as the application of sufficient pressure to cause adhesion of the metal to the screen. Upon completion of the pressing process, the metal containing screen was ready for use as an electrode without further treatment. By a similar procedure the active metal may be pressed onto a non-metallic support, such as graphite.

Example 4

A finely divided Pt-Re catalyst powder that was prepared by the techniques of Example 2 and a Pt powder prepared as in Example 1(b) were stored in demineralized $H_2O$ after washes with dilute $H_2SO_4$ and $H_2O$. These powders were then evenly spread onto 80 mesh Pt screens of 4 cm.$^2$ area as a moist slurry. 10–15 mg./cm.$^2$ of the catalyst were used to completely cover the surface in each instance. The electrode screens were backed with a Pt foil (0.003 inch thick), also of 4 cm.$^2$ area, and were connected to a 0.040 inch Pt lead wire. The catalyst was bonded to the electrode structure in a hydraulic press at 3,000 p.s.i. at room temperature. These electrodes were then used as an anode in a driven methanol-air fuel cell. The cell was filled with electrolyte of 3.7 M $H_2SO_4$ (preelectrolyzed) and 1.0 M $CH_3OH$ and was kept at 140° F. The driven counterelectrode (cathode) was a bright Pt foil of 6 cm.$^2$ area. The electrochemical potential of the anode was measured against a 4 n Ag/AgCl reference electrode at different current densities and the polarization versus theoretical $CH_3OH$ oxidation potential calculated.

Typical polarization values are:

| Electrode | Polarization in V vs. theoretical $CH_3OH$ at indicated current densities in ma./cm.$^2$ | | | | |
|---|---|---|---|---|---|
| | 0 | 1 | 10 | 50 | 100 |
| Pt | 0.40 | 0.49 | 0.55 | 0.59 | 0.61 |
| Pt-Re (33% Re) | 0.29 | 0.37 | 0.47 | 0.54 | 0.57 |

A mixture of $PtCl_4$ (751 mg.) and $Re_2O_7$ (287 mg.) was reduced with triisobutyl aluminum in monoglyme. The resulting solution was hydrolyzed with excess dilute sodium hydroxide. The resulting alloy was pressure bonded to a platinum screen. The performance is from 120 mv. at 1 ma./cm.$^2$ to 50 mv. at 50 ma./cm.$^2$ which is better than commercially used platinum and 20–30 mv. better than an analogous catalyst preparation which was obtained using sodium borohydride as the reducing agent as contrasted to an aluminum trialkyl reducing agent. The catalyst preparation contained 20 mole percent rhenium.

Example 6

The same catalyst was prepared as in Example 5. However, the hydrolysis was carried out using acid. In this case a very poor fuel cell catalyst was obtained. This was believed to be due to the acid leaching of rhenium, thereby resulting in a considerably lowered rhenium content of the catalyst.

Example 7

A platinum-rhenium catalyst with 18 mole percent rhenium was prepared by the same technique as in Example 5 except that hydrolysis was effected with 30% sulfuric acid. The metal powder was then bonded to a platinum screen and subjected to the same polarization test as described in Example 4. The polarization was better than plain platinum by 20 to 40 mv. The Tafel line was straight to 100 ma./cm.$^2$. See Kortum and Bockris, Electrochemistry, vol. 2, Elsevier, 1951, for relationship of Tafel line to electrochemical cells.

The above examples are presented merely to aid in understanding the present invention and are not to be considered as limiting since other embodiments may occur to those skilled in the art.

What is claimed is:

1. A method for preparing a catalyst bearing electrode for use in an electrochemical cell which comprises depositing on an electrically conductive base an integrally bonded coating including at least one finely divided metal, said finely divided metal being prepared by reacting at least one metal compound with an organoaluminum reducing agent, and hydrolyzing the reaction mixture to precipitate the finely divided metal.

2. The method of claim 1 wherein the finely divided metal is selected from the group consisting of mixtures and alloys of noble metals and base transition metals.

3. The method of claim 2 wherein the finely divided metal is selected from the group consisting of mixtures and alloys of platinum group metals and Group VIIB base transition metals.

4. The method of claim 1 wherein the finely divided metal is a platinum group metal.

5. The method of claim 1 wherein the reducing agent has the generic formula $Al(R)_2X$, wherein R is selected from the group consisting of hydrogen and $C_1$–$C_{20}$ hydrocarbyl radicals and X is selected from the group consisting of halogen, pseudohalogen, R and OR and at least one valence of the aluminum is satisfied by a hydrocarbyl radical.

6. The method of claim 5 wherein the reducing agent has the formula $Al(R_3)$ and each R is a $C_2$–$C_{20}$ alkyl radical.

7. A method for preparing a catalyst bearing electrode for use in an electrochemical cell which comprises depositing upon an electrically conductive base an integrally bonded coating including at least one finely divided metal selected from the group consisting of noble metals and base transition metals, said finely divided metal being prepared by reacting at least one metal compound with an organoaluminum reducing agent having the formula $Al(R_2)X$ wherein R is selected from the group consisting of hydrogen and $C_1$–$C_{20}$ hydrocarbyl radicals and X is selected from the group consisting of R, OR, pseudohalogen, and halogen radicals, and at least one valence of the aluminum is satisfied by a hydrocarbyl radical, the molar ratio of aluminum to total metal being at least about stoichiometric, and hydrolyzing the reaction product to precipitate the finely divided metal.

8. The method of claim 7 wherein the finely divided metal is selected from the group consisting of mixtures and alloys of platinum and rhenium.

9. The method of claim 7 wherein the finely divided metal is platinum.

10. The method of claim 7 wherein the finely divided metal is rhenium.

11. The method of claim 7 wherein the molar ratio of aluminum to metal is about 1:1 to 15:1.

12. The method of claim 7 wherein the organoaluminum compound has the formula $Al(R_2)OR$ and each R is a $C_1$–$C_{20}$ alkyl group.

13. The method of claim 7 wherein the organoaluminum compound has the formula $AlR_3$ and each R is a $C_1$–$C_{20}$ alkyl group.

14. A catalyst bearing electrode for use in an electrochemical cell which comprises an electron conductive base with an integrally bonded coating including at least one finely divided metal on a surface thereof, said metal comprising the precipitate prepared by hydrolysis of a mixture of at least one metal compound with an organoaluminum compound, said metal and aluminum being present in a molar ratio in the range of 1:1 to 15:1, in a solvent.

15. The electrode of claim 14 wherein said metal is a platinum-rhenium composite.

16. The electrode of claim 14 wherein said metal is platinum.

17. An electrochemical cell comprising an aqueous electrolyte container, nonsacrificial electrodes consisting of an anode and a cathode, said electrodes being positioned in said electrolyte container, conduction means establishing electrical communication between said anode and said cathode external to said electrolyte container, means for admitting a fuel in contact with said anode, means for admitting an oxidant into contact with said cathode, said electrodes comprising an electron conductive base with an integrally bonded coated including at least one finely divided metal on a surface thereof, said metal comprising the precipitate prepared by hydrolysis of a mixture of metal salts with an organoaluminum compound, said metal and aluminum being present in a molar ratio in the range of 1:1 to 15:1, in a solvent selected from the group consisting of hydrocarbons and Lewis bases.

18. The cell of claim 17 wherein said metal is a platinum-rhenium composite.

19. The cell of claim 17 wherein said metal is platinum.

References Cited
UNITED STATES PATENTS

| | | | |
|---|---|---|---|
| 3,242,011 | 3/1966 | Witherspoon | 136—120 |
| 3,287,171 | 11/1966 | Holt | 136—120 |
| 3,323,902 | 6/1967 | Kroll | 75—.5 |

WINSTON A. DOUGLAS, *Primary Examiner.*

C. LE FEVOUR, *Assistant Examiner.*

U.S. Cl. X.R.

136—86